June 8, 1954 J. A. RAJCHMAN Re. 23,838
POST-DEFLECTED COLOR-KINESCOPE
Original Filed Sept. 14, 1950 2 Sheets-Sheet 1
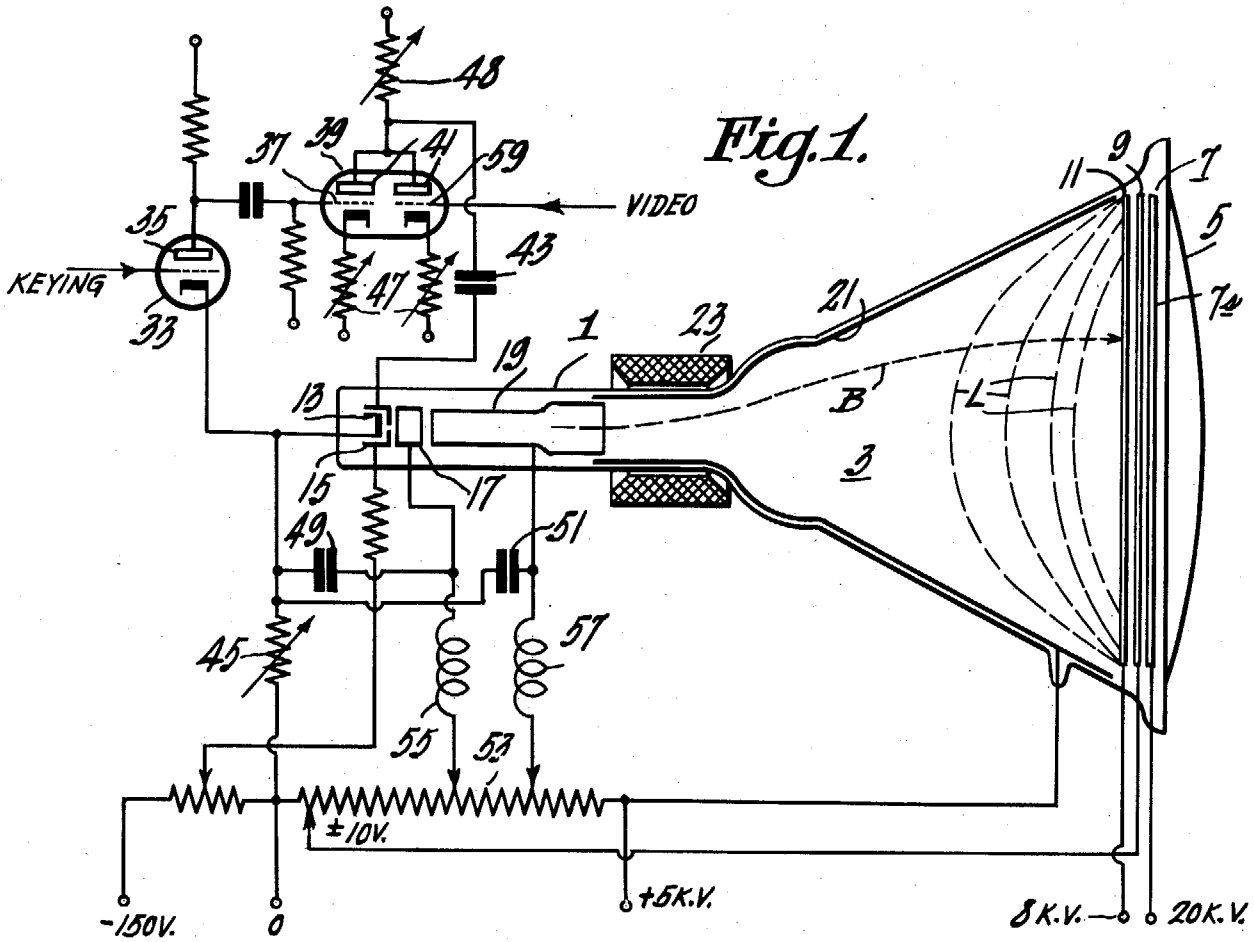
INVENTOR
Jan A. Rajchman
BY
Roderick Malcolm
ATTORNEY

POST-DEFLECTED COLOR-KINESCOPE

Original Filed Sept. 14, 1950 2 Sheets-Sheet 2

INVENTOR
Jan A. Rajchman
BY
Roderick Malcolm
ATTORNEY

Reissued June 8, 1954

Re. 23,838

UNITED STATES PATENT OFFICE 23,838

POST-DEFLECTED COLOR KINESCOPE

Jan A. Rajchman, Princeton, N. J., assignor to Radio Corporation of America, a corporation of Delaware Original No. 2,619,608, dated November 25, 1952, Serial No. 184,857, September 14, 1950. Application for reissue October 5, 1953, Serial No. 384,366

13 Claims. (Cl. 313—86)

Matter enclosed in heavy brackets [ ] appears in the original patent but forms no part of this reissue specification; matter printed in italics indicates the additions made by reissue.

This invention relates to cathode-ray tubes and particularly to improvements in color-kinescopes of the kind wherein the scanning beam, or electrons derived from said beam, are "post-deflected" (i. e. deflected, focused or otherwise directed subsequent to the scanning movement) for the purpose of selectively activating the different color-phosphors on the target surface of a screen.

Those skilled in the art to which this invention appertains know that color-kinescopes of the "post deflected" variety possess certain advantages over color-television tubes of the presently popular "directional-screen" variety. By way of example; "directional-screen" kinescopes must employ either a rotating beam or an assembly of three-guns for selectively activating the differently colored-phosphor screen-areas, but "post-deflected" tubes may, and usually do, employ a single-gun and a conventional (horizontal and vertical) scanning pattern. Thus, tubes of the latter type have no beam-convergence problems, either of a mechanical or electrical nature. Furthermore, "post-deflected" tubes use substantially lower scanning voltages, hence their auxiliary circuits present no complex problems of insulation or design.

"Post-deflected" kinescopes are of two kinds (1) the kind wherein the post-deflected electrons are derived directly from the primary-beam and (2) the kind wherein the electrons that are "post-deflected" are secondary-electrons, derived from impact of the primary beam upon a thin-metal target mounted in front of the electron-sensitive surface of the screen.

Copending application of Rajchman, Serial No. 151,397 filed March 23, 1950 *now U. S. Patent No. 2,646,521* describes a post-deflected color-kinescope of the first mentioned variety and copending application of Rosenberg and Rajchman Serial No. 168,562 filed June 16, 1950 now U. S. Patent 2,584,814 describes a color kinescope of the latter (secondary-electron) variety.

The color-kinescopes described by Rajchman and by Rajchman and Rosenberg, in their above identified disclosures, possess all of the advantages peculiar to "post-deflected" tubes. However, the tubes there described may be said to be more complex and costly than is desirable in an instrument designed for use in the home. The principal complexity is the target or screen assembly which, in the case of a tri-color tube, comprises not less than six separate plate-like elements.

Accordingly, the principal object of the present invention is to provide an improved kinescope of the "post-deflected" type and one characterized by the simplicity and economy of its parts.

Another and important object of the invention is to provide a "post-deflected" color-kinescope wherein, if desired, color-selection may be determined by the instantaneous potential of the cathode and the intensity of the selected color may be determined, simply by modulating the cathode-grid potential of the "gun" of the tube with video-signals transmitted by any known type (e. g. "dot-sequential," "line-sequential" or "field sequential") television-system.

The foregoing and other objects are achieved in accordance with the invention by the provision of a tri-part target assembly comprising (1) a color-screen wherein the sub-elemental color-phosphor areas are concentrically arranged, (2) a masking electrode for deriving one or more annular beams of electrons from the normally "solid" scanning beam and (3) an electron-lens element capable of altering the "inner" and "outer" diametrical dimensions of the annular beam or beams and causing the beam electrons to activate the concentrically disposed sub-elemental phosphor covered areas on the screen in the manner and sequence dictated by the video signals.

The invention is described in greater detail in connection with the accompanying two sheets of drawings, wherein:

Fig. 1 shows a post-deflection color-kinescope, embodying the invention, and appropriate circuit connections for its various electrodes;

Figure 3:
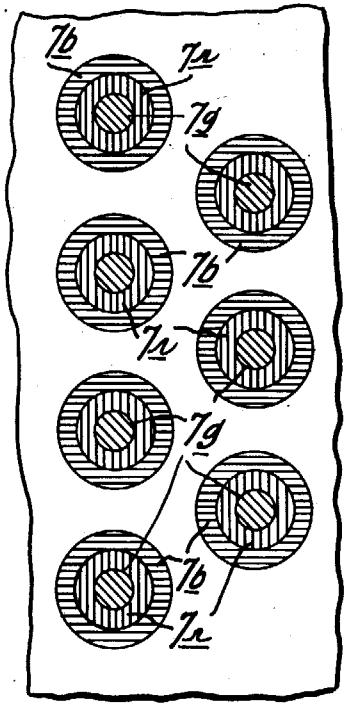
Fig. 3 is a similar view of the color-screen element of the target-assembly.

The color-kinescope shown in Fig. 1 comprises an evacuated envelope having a neck portion 1 and a bulbous portion or main chamber 3, the latter being provided with a transparent or translucent window 5 through which the obverse face 7s of the screen 7 of the tri-part color-target assembly (7, 9, 11) of the invention may be viewed. The single electron-gun in the neck of the tube may be of conventional form and dimensions and, in the instant case, comprises an indirectly-heated cathode 13, a control grid 15, a "screen" or accelerating electrode 17 and first and second anodes 19 and 21 respectively. The second anode 21 comprises a conductive coating which covers the inner surface of the envelope from a point adjacent the leading end of the first anode 19 to point just short of the innermost plate 11 of the target assembly. This anode 21 serves to accelerate the beam B and, further, to establish an electron lens-field (indicated by the curved lines L) which operates to bend or "normalize" the beam so that it always approaches the target element 11 at an angle of substantially 90°. A conventional coil assembly or yoke 23, mounted on the neck of the tube, is here employed to impart the requisite horizontal and vertical components of the scanning movement to the beam.

Figure 4:
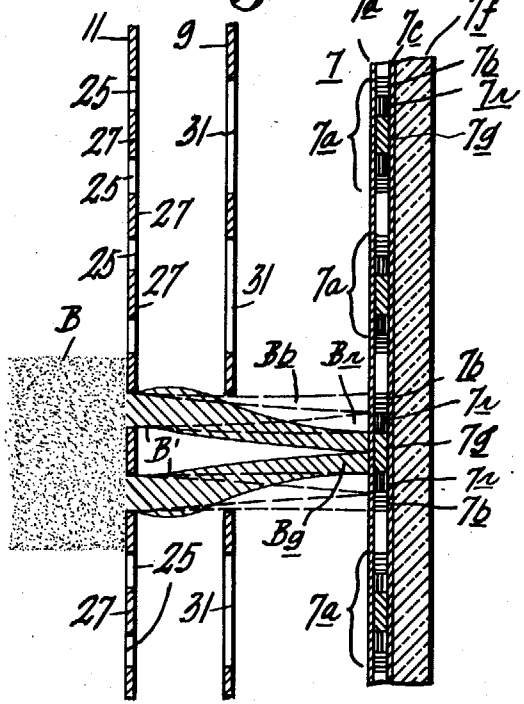
Fig. 4 is a vertical sectional view of the tri-part target assembly, the drawing being marked to indicate the manner in which the mask and lens elements of the target-assembly cooperate in directing the beam, selectively, to the several differently colored-phosphor parts of the ray-sensitive areas on the target surface of the screen.
Figure 2:
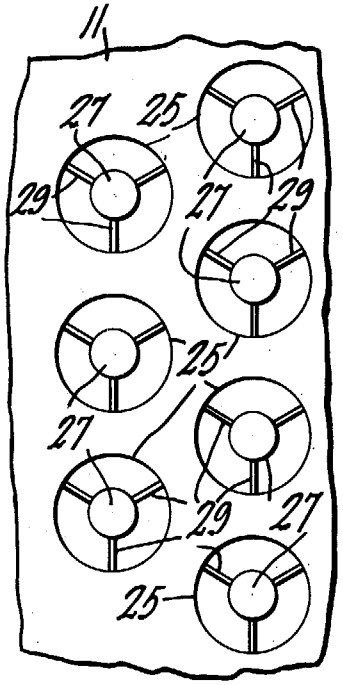
Fig. 2 is *a* fragmentary plan view of the apertured masking element of the target-assembly of the kinescope of Fig. 1.

The part 11 of the target assembly 7, 9, 11, upon which the scanning beam B first impinges comprises a thin yet rigid metal (e. g. nickel) plate containing a multiplicity of "ring-shape" holes 25, the centers of which are masked by little discs 27, supported by two or more very thin supporting arms 29. The arcuate segments of the holes 25 and the discs 27 operate to convert the normally "solid" scanning beam B into one or more "hollow" beams B′ (Fig. 4) of annular cross-section. The distance between the centers of the discs 27 in the masking plate 11 is preferably smaller than the diameter of the "solid" beam B, hence said beam, at any given instant, will be broken up into more than one "hollow" annular beam B′ in passing through the apertures in the plate 11. (In order to simplify the drawing, but one such "hollow" beam B′ is shown in Fig. 4.)

The second element of the tri-part target assembly is an electron-lens element in the form of a flat metal plate 9 containing the same number of circular holes 31 as there are ring-shape holes 25 in the mask. The center of each circular hole 31 in the plate 9 is in register with the center of the disc 27 of one of the ring-shape mask-holes 25. The diameter of each of said circular holes 31 is equal to or slightly greater than the outer diameter of the ring-shape hole with which it is paired. The beam-focusing plate or lens element 9 is mounted parallel to the beam-forming accelerating plate or mask 11 at a distance of from ¾ to 1.5 times the diameter of its holes. It is electrically insulated from the mask 11 and, as indicated in Fig. 1, it ordinarily operated at a potential of ±10 volts with respect to the cathode 13 and has, therefore, a retarding effect on the electrons.

The screen element 7, upon which the electrons eventually impinge, comprises a foundation member 7f constituted of glass or other transparent or translucent material. The inner or "target" surface of this plate-like foundation member is provided with a light-transparent, electrically conductive coating or layer 7c (see Fig. 4). The outer surface of this conductive layer 7c contains a multiplicity of ray-sensitive areas 7a of elemental image-dimensions, disposed in register with the similarly dimensioned holes 25 and 31 in the mask 11 and focusing plate 9. Each of these elemental ray-sensitive areas 7a comprises a number (in this case, three) of concentrically disposed ray translating parts 7g, 7r and 7b of "sub-elemental" image-dimensions (as that term is understood in the television art). Each sub-elemental part or area is constituted essentially of a fluorescent material capable of emitting light of a color individual to that part. The outer or target surface of these fluorescent (phosphor) deposits may support an electron-transparent conductive layer 7d, e. g. of aluminum, applied by an evaporation process, in vacuo. If such a film 7d is employed it is electrically connected to the other metallic coating 7c.

The colored lights emitted by different color-phosphors may be, and usually are, of different intensities, per unit area. It is usually desirable that each of the sub-elemental areas 7b, 7r and 7g emit the same quantity of light when struck by the same number of electrons of the same velocity. Accordingly, in order to compensate for the differences in the sizes of the circular phosphor-parts 7g, 7r and 7b, the smallest or innermost circle 7g is preferably constituted of the phosphor which exhibits the maximum relative intensity of emission, and the larger circles 7r and 7b comprise phosphor materials of respectively lower intensities of emission. The particular phosphor materials employed may be the ones specified in Leverenz U. S. Patent 2,310,-863 in which case the "green" phosphor (zinc silicate with manganese activator) comprises the innermost ring 7g, the "red" phosphor (cadmium borate with manganese activator) the central ring 7r and the "blue" phosphor (calcium manganese silicate with titanium activator) the outermost ring 7b.

The deposition of these different color-phosphors on the conductive surface 7c of the screen 7 may be accomplished with the aid of suitable stencils (not shown) either by deposition in a settling tank (not shown) or by the "silk-screen" method. In either event, three different stencils (not shown) are used. In depositing the inner phosphor part 7g, a metal stencil or a silk-screen with circular phosphor-pervious apertures may be used. If the silk-screen method is employed the other two screens have annular phosphor-pervious apertures of dimensions corresponding to those of the blue and red areas, 7b and 7r, respectively. If metal stencils are used, the second and third stencils are provided with appropriately dimensioned ring-shape apertures with their centers supported by two or more very thin supporting arms, as in the case of the mask 11, previously described. The masking electrode 11, the focusing plate 9, and the metal or cloth stencils used in laying down the discrete phosphor areas 7b, 7r, 7g on the foundation of the screen 7, may be made by the photoengraving technique heretofore used (see copending application of H. B. Law, Serial No. 158,901) *now U. S. Patent 2,625,734* in making the masking plates of so-called "masked-target kinescopes."

The operation of the color-kinescope of the invention is as follows: The normally "solid" beam B from the electron-gun in scanning the target surface of the mask 11, encounters the ring-shape holes 25 in the mask 11 which divide the beam into a plurality of sub-beams or "jets" B′ (Fig. 4) of annular cross-section. These hollow jets pass through the circular holes 31 in the plate-like electron-lens element 9. This plate 9 is operated at potentials considerably lower than that of the mask 11 and screen 7. As a consequence, electrostatic lens-fields are formed adjacent to the apertures 31 in the lens plate 9. Each lens-field operates to alter the ("inner" and "outer") diametrical dimensions of the particular hollow jet of electrons B′ that passes through that field. After passing through the lens-plate 9 the beam is post-accelerated by the reason of the high voltage applied to the metal layer 7c (or layers 7c and 7d) on the screen 7. Appropriate operating voltages for the mask (e. g. 8 kilovolts) and screen (e. g. 20 kilovolts) are marked on Fig. 1 of the drawing.

During the scanning movement a hollow jet of electrons bombards one or another of the concentrically disposed sub-elemental phosphor parts 7g, 7r or 7b of each ray-sensitive elemental area 7a on the target surface of the screen 7. The particular sub-elemental phospor area upon which the electrons impinge at any given instant depends either (a) upon the strength of the electrostatic lens-field through which the hollow beam or jet B′ passes or (b) the velocity of the electrons passing through said field. The strength of the lens-field depends upon the instantaneous potential of the lens-plate 9 with respect to the cathode 13 and this potential is determined by the color keying signals. As shown by the broken-lines Bb in Fig. 4, when the beam retains the annular dimensions with which it was endowed in passing through the masking plate 9 it will strike only the outer ("blue") phosphor ring 7b on the screen 7. When the lens field is intensified to certain degree the diametrical dimensions of the annular beam B′ are reduced, as indicated by the broken lines Br, and it strikes only the intermediate ("red") phosphor ring 7r. A greater intensification of the field about the apertures in the lens plate 9 concentrates the beam and focuses it, as indicated by the solid lines Bg, upon the innermost ("green") phosphor 7g. If the lens-plate 9 is caused to operate at potentials close to cathode-potential a very sensitive control is achieved.

Color-kinescopes constructed in accordance with the principle of the present invention are susceptible of more than one mode of operation and it is apparent that various circuit arrangements may be devised for each mode. One way of operating a post-deflected kinescope is to apply the color-selecting keying impulses directly to the lens-plate and to vary the cathode-grid potential with the video signals. As a practical matter the interelectrode capacitance of the tri-part target assembly 7, 9, 11 may limit this method to the (relatively low) keying speeds used in "field-sequential" and "line-sequential" television systems.

A circuit that avoids the above mentioned limitation is shown in Fig. 1. Here the color-keying voltages are applied directly to the cathode 13 from a cathode-follower tube 33. At the same time, keying-signals of opposite polarity are taken off the plate 35 of the follower tube 33 and applied to the grid 37 of a double triode 39. The plate or plates 41 of the double diode 39 are connected through a capacitor 43 or to the control grid 15 of the kinescope. Therefore, when the resistor 45 in the cathode follower circuit, and the degenerative resistors 47 and plate resistor 48 of the double triode 39 are properly adjusted, the potential on the grid 15 of the kinescope varies identically with the potential of the cathode 13. Since the potential on the lens plate 9 is fixed, the keying pulses on the cathode 13 determine the difference in potential of the lens plate with respect to the cathode and hence the particular color upon which the annular beam impinges. The lens-effect of the tri-part screen assembly is varied in this case by varying the velocity of the electrons which pass therethrough, rather than varying the contour of the lens-field about each hole (as would be the case if the keying signals were to be applied to the lens plate).

In order to prevent the keying voltages on the cathode 13 from altering the focus of the beam, the accelerating electrode 17 and the first anode 19 are A.-C. connected to the cathode 13 through large capacitors 49 and 51, and are D.-C. connected to the voltage source 53 through suitable inductors or choke coils 55 and 57. In order to vary the intensity of the beam in accordance with the incoming video signals, said signals are applied to the grid 59 of the other half of the double triode and, since the plates 41 of this tube are connected to the grid 15 of the kinescope, the video signals operate to vary the intensity of the beam B in accordance with said signals. When the keying voltages are applied to the cathode 13 of the kinescope slight changes in the position of the beam may occur. However, such changes are insignificant because the percentage variation in velocity of the electrons in the region in which they are deflected is quite small.

From the foregoing it will be apparent that the present invention provides an improved kinescope of the "post-deflected" variety and one characterized by the simplicity and economy of its parts.

What is claimed is:

1. A television screen comprising a foundation member having a target surface containing a multiplicity of groups of electron-sensitive areas *each* consisting essentially of a plurality of concentrically disposed electron-sensitive parts.

2. The invention as set forth in claim 1 and wherein said concentrically disposed electron-sensitive parts of said target surfaces are each constituted essentially of a fluorescent material capable of emitting light of a color individual to that part.

3. The invention as set forth in claim 2 and wherein the fluorescent materials [of which said different fluorescent materials] *in each area* normally emit colored light of respectively different intensities, per unit of area, and wherein the innermost one of said concentrically disposed electron-sensitive parts comprises the fluorescent material of the relative maximum intensity of emission.

4. A television image-screen comprising a foundation member having a target surface containing a multiplicity [of groups] of electron-sensitive areas of elemental image-dimensions, said [ray] *electron*-sensitive areas each comprising a plurality of concentrically disposed electron-sensitive parts of sub-elemental image-dimensions.

5. In an electron-beam tube, electrode means for producing an electron-beam of substantially annular cross-section, a screen mounted in spaced relation with respect to said electrode means and comprising a target surface having a plurality of concentrically disposed electron-sensitive parts disposed in the path of said annular beam, and an electron-lens element mounted adjacent to the space between said electrode means and screen for altering the diametrical dimensions of said annular beam whereby selectively to activate said concentrically disposed electron-sensitive parts of said target surface.

6. The invention as set forth in claim 5 and wherein said electron-lens element comprises a metal plate containing apertures of a diameter sufficient to permit the passage of said annular beam, the centers of said apertures being disposed in register with the common center of said concentrically disposed electron-sensitive parts of said screen.

7. The invention as set forth in claim 5 and wherein said annular-beam producing means comprises an electron-gun and a mask mounted in the path of the electrons from said gun, said mask comprising a diaphragm containing a multiplicity of electron-opaque portions each substantially surrounded by a plurality of circularly disposed, arcuate, electron-transparent portions.

8. The invention as set forth in claim 7 and wherein said mask is mounted adjacent to said target surface of said screen and said electron-gun is mounted remote from said mask in a position to scan said target surface.

*9. A fluorescent screen for use in a cathode ray tube and which is formed of phosphors fluorescing in different colors, when subjected to electron impact, said screen comprising a first phosphor arranged on a supporting plate in a regular pattern of discrete elements individually having a predetermined area and at least one other phosphor having a lower intensity if light-emission upon electron impact than that of said first phosphor and arranged on said plate in a regular pattern of similar discrete elements individually having an area larger than said predetermined area.*

*10. A fluorescent screen as claimed in claim 9 and wherein there are at least three phosphors, two of which have a lower intensity of light-emission upon electron impact than that of said first phosphor and each arranged on said supporting plate in a regular pattern of similar discrete elements individually having an area larger than said predetermined area.*

*11. A fluorescent screen as claimed in claim 9 and wherein said first phosphor is arranged on said plate in a regular pattern of discrete elements having a predetermined aggregate area and said other phosphor has a lower intensity of light-emission upon electron impact than said first phosphor and is arranged on said plate in a regular pattern of similar elements having an aggregate area larger than said predetermined aggregate area.*

*12. A fluorescent screen as claimed in claim 9 wherein the different areas of the supporting plate occupied by the individual phosphors are proportional to substantially the inverse of the intensities of light-emission of the phosphors upon electron impact.*

*13. A fluorescent screen as claimed in claim 9 wherein the discrete elements are of circular shape.*

References Cited in the file of this patent or the original patent

UNITED STATES PATENTS

| Number | Name | Date |
|---|---|---|
| Re. 22,115 | Herbst | June 16, 1942 |
| 1,932,637 | Richardson | Oct. 31, 1933 |
| 2,335,675 | Holters et al. | Nov. 30, 1943 |
| 2,429,849 | Somers | Oct. 28, 1947 |
| 2,462,569 | Sziklai | Feb. 22, 1949 |
| 2,495,697 | Chilowsky | Jan. 31, 1950 |
| 2,508,267 | Kasperowicz | May 16, 1950 |
| 2,543,477 | Sziklai et al. | Feb. 27, 1951 |